UNITED STATES PATENT OFFICE.

ALBERT RAMMOSER, OF BERLIN, GERMANY.

AUTOMATIC GAS-IGNITER.

SPECIFICATION forming part of Letters Patent No. 612,177, dated October 11, 1898.

Application filed November 19, 1897. Serial No. 659,177. (No specimens.)

*To all whom it may concern:*

Be it known that I, ALBERT RAMMOSER, a citizen of the German Empire, and a resident of Berlin, Germany, have invented certain new and useful Improvements in Automatic Gas-Lighting Apparatus for Incandescent Lamps, of which the following is a specification.

The present invention concerns the production of a new kind of lighting medium for incandescent lights in the shape of a cord, in which the several auxiliary and supplementary contrivances needed by gas self-lighters of older systems are not only abolished, but which, moreover, is distinguished from such lighters by its simplicity and its quicker and more faultless action. These lighting-cords are obtained by using two wires, (as thin as possible,) one of pure platinum or palladium and the other preferably of iridium or optionally of osmium, rhodium, ruthenium, or a corresponding alloy of the last-named metals among each other in such a manner that these wires are either lightly covered with thread or spun over with a parallel running winding of a cotton material or some other appropriate layer of vegetable fiber. The wire is then dipped into a two to five per cent. soluble glass solution, which has been strongly saturated with a corresponding quantity of ordinary kitchen-salt and dried in the air. This is followed by a second covering with the same kind of vegetable fiber, which has been previously dipped into a strongly-saturated solution of nitrate of magnesia or nitrate of lime and air-dried. It is discretionary to add a third and a fourth layer of a natural (undressed) vegetable fiber which has been previously cleansed in ether. After this has been done the cords thus treated are dipped into a chlorid-of-palladium solution and allowed again to dry in the air. Then a paste is prepared from pure platinum sal-ammoniac (free of iridium) by adding water or diluted (aqueous) ammonia. This paste is well kneaded and dried over a spirit-flame, allowing it to arrive almost to white heat. The paste is then pulverized. Part of the powder is placed on a glass plate and spread there. The cords having been cut into pieces of suitable length are placed upon the powder and impregnated with this powder under pressure exercised by means of a second glass plate, which is rolled to and fro over them. Then bundles of these cords are exposed to a bath of hydrogen gas under exclusion of air, and after this operation they are ready for use.

I claim—

1. A lighting-cord for incandescent lights consisting of a wire of platinum or palladium and a second wire of iridium, osmium, rhodium, ruthenium or a suitable alloy of the latter metals, said wires being covered with vegetable fiber, impregnated with a paste of platinum sal-ammoniac and diluted ammonia, and exposed to a bath of hydrogen gas, substantially as described.

2. The herein-described process of making a lighting-cord for incandescent lights consisting in treating a wire of platinum or palladium and a second wire of iridium, osmium, rhodium, or ruthenium having a covering of vegetable fiber with a solution of soluble glass and common salt, applying a second layer of vegetable fiber dipped into a solution of nitrate of magnesium or nitrate of lime, then drying the wires with their coverings, then applying a third layer of fiber which has been previously cleaned in ether but which is otherwise in its natural undressed condition, then dipping the material into a platinum-chlorid solution, then drying the material, impregnating it with a paste of platinum sal-ammoniac, then subjecting the material to a hydrogen-gas bath under exclusion of air.

In testimony that I claim the foregoing as my invention I have signed my name in presence of two subscribing witnesses.

ALBERT RAMMOSER.

Witnesses:
WALDEMAR HAUPT,
HENRY HASPER.